US012425391B2

United States Patent
Ramezanpour et al.

(10) Patent No.: US 12,425,391 B2
(45) Date of Patent: Sep. 23, 2025

(54) AUTHENTICATION OF DEVICE IN NETWORK USING CRYPTOGRAPHIC CERTIFICATE

(71) Applicant: Andro Computational Solutions, LLC, Rome, NY (US)

(72) Inventors: Keyvan Ramezanpour, New Hartford, NY (US); Jithin Jagannath, Oriskany, NY (US); Anu Jagannath, Oriskany, NY (US); Andrew Louis Drozd, Rome, NY (US)

(73) Assignee: ANDRO COMPUTATIONAL SOLUTIONS, LLC, Rome, NY (US)

( * ) Notice: Subject to any disclaimer, the term of this patent is extended or adjusted under 35 U.S.C. 154(b) by 326 days.

(21) Appl. No.: 18/165,667

(22) Filed: Feb. 7, 2023

(65) Prior Publication Data

US 2023/0254302 A1    Aug. 10, 2023

Related U.S. Application Data

(60) Provisional application No. 63/267,676, filed on Feb. 8, 2022.

(51) Int. Cl.
*H04L 9/40* (2022.01)
*G06F 21/44* (2013.01)

(52) U.S. Cl.
CPC .......... *H04L 63/0823* (2013.01); *G06F 21/44* (2013.01); *H04L 63/20* (2013.01)

(58) Field of Classification Search
CPC ..... G06F 21/44; H04L 63/08; H04L 63/0823; H04L 63/0876; H04L 63/10–108; H04L 63/20; H04L 9/3263; H04L 9/50; H04W 12/06; H04W 12/065; H04W 12/069; H04W 12/08
See application file for complete search history.

(56) References Cited

U.S. PATENT DOCUMENTS

| | | | |
|---|---|---|---|
| 11,381,972 B2 | 7/2022 | Kvochko et al. | |
| 11,411,958 B2 | 8/2022 | Pularikkal et al. | |
| 11,540,130 B2 | 12/2022 | Grutzmacher et al. | |
| 2021/0224375 A1* | 7/2021 | Fong | G06F 21/44 |
| 2021/0344573 A1 | 11/2021 | McGrew et al. | |
| 2022/0094546 A1* | 3/2022 | Ying | H04L 9/30 |
| 2022/0114260 A1* | 4/2022 | Udupi Raghavendra | G06F 21/577 |
| 2022/0247678 A1* | 8/2022 | Atwal | H04L 45/645 |

* cited by examiner

*Primary Examiner* — Kevin Bechtel
(74) *Attorney, Agent, or Firm* — Hoffman Warnick LLC (57) ABSTRACT

Embodiments of the disclosure provide distributed authentication with network segmentation and dynamic authorization for networks. The system may include a device within a network of devices. An identifier is within the device and includes a cryptographic certificate. The device is configured to transmit the identifier to an authenticator as a security proof. The authenticator is configured to disable the device from performing at least one operation within the network before verifying an identity of the device via the identifier.

18 Claims, 9 Drawing Sheets

AUTHENTICATION OF DEVICE IN NETWORK USING CRYPTOGRAPHIC CERTIFICATE

CROSS-REFERENCE TO RELATED APPLICATIONS

The present application claims priority to U.S. Provisional Patent Application No. 63/267,676 filed Feb. 8, 2022.

TECHNICAL FIELD

The present disclosure relates to network security. Specifically, embodiments of the disclosure provide a system and method for authenticating a device in a network using a cryptographic certificate.

BACKGROUND

Networks of interconnected devices distributed over a geographical area, sometimes known as Internet of Things (IoT) networks, have been deployed in settings such as data collection and environmental awareness, autonomous operations, command and/or mission controls. However, the highly dynamic nature of an IoT network involving many heterogeneous devices, often resource-constrained and operating on battery, may cause technical challenges. The IoT devices, for example, may operate in physically unprotected environments posing a higher risk of security attacks such as counterfeiting, communication channel sniffing and eavesdropping, identity spoofing, and even credential stealing using side-channel analysis. IoT devices may operate at the frontier of a mission and are vulnerable to adversary manipulation. These settings may demand security guarantees on the identity and authenticity of the devices and appropriate authorization for accessing network resources.

In an IoT setting, identity privacy of the participating devices is the first measure of defense against security attacks. The activities of known IoT devices, obtained through eavesdropping, can reveal sensitive information about the operations, goals, and status of a mission. Further, many other security attacks including spoofing, impersonation, and counterfeiting, require (or are otherwise facilitated by) identifying the identity of devices in the network. By identifying IoT devices that interact physically with the environment, adversaries can gain control of devices (e.g., through malware installation) and interfere with the mission.

In the setting of a centralized security service providers (for authentication, authorization, and key exchange), such providers have been targeted by simple, yet effective, security attacks such as denial of service (DOS) and distributed DoS (DDoS) attacks. This situation is exacerbated with a large volume of IoT devices which heavily rely on communication networks for proper operation. Centralized security systems create a single point of failure, which when combined with special characteristics of IoT networks, raise serious concerns about a new type of cybersecurity weapons called unintrusive precision cyber weapons (UPCW). These attacks often require low pre-attack intelligence gathering and pre-positioning of exploits while inflicting more effective battle damage. In addition to DDOS, in which many IoT devices are exploited to overload network resources, denial-of-sleep (DoSL) specifically targets IoT devices operating on battery, by occupying computation and communication resources of the device.

IoT networks may include several heterogeneous and resource-constraining devices with a diverse range of computational and communication capabilities and limited energy sources. Hence, implementing high-end security protocols might be costly and incur large overhead on the devices. A large overhead (even for implementing security primitives) on devices can itself be a source of security attacks such as DoS (by sending a large volume of transactions to the device and exhausting its resources). Complex security algorithms, such as elliptic curve cryptography (ECC) for digital signatures and key exchange protocols, might not be suitable solution for enhanced security on commercial off-the-shelf (COTS) IoT devices.

SUMMARY

The illustrative aspects of the present disclosure are designed to solve the problems herein described and/or other problems not discussed.

Aspects of the disclosure provide a system including: a device within a network of devices; and an identifier within the device and having a cryptographic certificate, wherein the device is configured to transmit the identifier to an authenticator as a security proof, and wherein the authenticator is configured to disable the device from performing at least one operation within the network before verifying an identity of the device via the identifier.

Further aspects of the disclosure provides a system for authenticating a device within a network of devices, the system including: an identifier within a device of the network, and having a cryptographic certificate; and an authenticator in communication with the device, wherein the authenticator performs actions including: disabling the device from performing at least one operation within the network before verifying an identity of the device via the identifier, first verifying an identity of the device within the network based on the identifier and using a distributed ledger, second verifying the identity of the device based on authentication by other devices within the network using the distributed ledger.

Additional aspects of the disclosure provide a method for authenticating a device within a network of devices, the method including: disabling the device from performing at least one operation within the network before verifying an identity of the device via an identifier having a cryptographic certificate; first verifying an identity the device within the network based on an identifier of the device and using a distributed ledger; second verifying the identity of the device based on authentication by other devices within the network using the distributed ledger; and enabling the device to perform the operation in response to the first verifying and the second verifying.

DETAILED DESCRIPTION

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described to best explain the principles of the disclosure and the practical application, and to enable others of ordinary skill in the art to understand the disclosure for various embodiments with various modifications as are suited to the particular use contemplated.

Embodiments of the disclosure provide a system and method for authenticating one or more devices in a network using an identifier with an associated cryptographic certificate. Embodiments of the disclosure provide a secure decentralized identity (DID) system, including a set of "identifiers" with verifiable credentials for networked devices, including lightweight internet of things (IoT) devices. Embodiments of the disclosure provide a system implemented on a device within a network of devices. One or more devices within the network may have an identifier (i.e., a dedicated data field) including a cryptographic certificate to be used for authenticating the device within the network, and/or other networks with which it interacts. The device transmits the identifier to an authenticator (e.g., another device in the network and/or a centralized security component) as a security proof for the device within the network. The authenticator, upon detecting the device within the network, disables the device from performing at least one operation within the network (e.g., communicating with verified devices). The authenticator may verify the identity of the device using the cryptographic certificate. Upon successfully verifying the identifier, the authenticator may permit the device to perform one or more previously-disabled operations within the network.

The disclosure may be implemented to provide a layered architecture supporting multi-trust zones, and to provide macro- and micro-segmentation of network resources. The DID attributes in each identifier may be defined for specific goals and security requirements of a mission, i.e., the identifier and properties for verification can change from mission to mission. Embodiments of the disclosure are operable, upon verifying a device, to provide only a minimum number of privileges to devices. Such privileges may be only those required for mission completion. The cryptographic certificates within each identifier may be provided using distributed ledger technology (DLT). DLT permits certificates that are cryptographically secure against forgery with nonrepudiation property, verifiable in a real-time distributed system for authentication and authorization with a dynamic policy while incurring only a small operational overhead on resource-constrained devices.

Various implementations of the disclosure provide a continuous multi-factor authentication (CMFA) mechanism for devices within a network to enable communication for distributed authentication, and authorization with dynamic policy enforcement (i.e., policy enforcement that is changeable under different circumstances). A distributed authentication protocol, providing a record of all transactions, can be used for authorization and may be based on distributed ledgers. DIDs ensure privacy in the network during the authentication process because the link between a given DID and an IoT device (simply "device" hereafter) is not revealed by observing the record of transactions. Only the identity management component of the network access control (NAC) can identify the link. Embodiments of the disclosure may apply federated learning (a paradigm of machine learning) that help policy engines in event and/or anomaly detection. The learning engine represents behavioral analytics of devices in the network and facilitates implementation of a dynamic policy in the NAC for device authorization.

Methodologies for authentication and DID systems according to the disclosure are fully compatible with the Department of Defense (DoD) "Zero Trust" reference architecture, and thus may enable implementation of full Zero Trust controls and capabilities. To provide secure, distributed and privacy-preserving device identification and authorization, embodiments of the disclosure may include various specialized components, examples of which are discussed herein.

The DID system also may be compatible with multi trust zones to support macro-segmentation of the network. The attributes of the identifier define fine-grained operations as when a device is allowed to conduct a specific mission (based on the goals and security requirements), and thus, implement micro-segmentation in the network. The identifiers, and the associated attributes, are assigned to devices by the Enterprise Federated Identity Service Provider (IDP) for the specific mission. Only the IDP can link the assigned identifier with a real device and the specific mission in which the identifier is valid. Hence, eavesdropping on the communication channel does not reveal any information about the specific device that owns a given identifier, the attributes (privileges) of the device in the network, and the goals/operations of the mission. Further, a device can own different independent identifiers at different trust zones of the network and for different operations it is assigned to conduct in the mission. Therefore, spoofing one identifier assigned to a device does not reveal information about the operations of the device in other trust zones.

The attributes associated with an identifier for one device may be determined by the IDP based on the role of the device in a mission with the least privileges that are necessary to complete the mission. To implement a distributed authentication system, the attributes of the identifiers are defined in the format of certificates recorded using distributed ledger technology (DLT). The certificates are secure against forgery and verifiable by authenticators while the identity privacy of devices is preserved. The certificates are issued by trust authorities, which are also authorized by the network access control. The distributed ledger records issuance and revocation of certificates along with the authentication transactions that use these certificates. Hence, a real-time record of all activities of a device (i.e., within the identifier itself) and the associated privileges are available for the authorization process.

Embodiments of the disclosure also provide continuous multi-factor authentication (CMFA). Multi-factor authentication (MFA) can be used to create a zero trust reference architecture. However, existing MFA technologies are mainly designed for human subjects, using software/hardware tokens or biometrics. CMFA authentication for devices and machine-to-machine communications, by contrast, supports zero trust architecture and can be used as a basis for enforcing dynamic policy authorization. Devices in the network may conduct multi-factor authentication in a distributed manner (in which the authenticator servers act as intermediaries). Alternative approaches include defining independent identifiers and distributed CMFA servers which act as additional factors of authentication for a given device.

Further components in embodiments of the disclosure provide authorization with dynamic policy & AI/ML based anomaly detection. The record of authentication transactions and cryptographic certificates corresponding to different identifiers of a device complements behavioral analytics and real-time monitoring of the network access control for device authorization with dynamic policy. The certificates provide a proof of (least) privileges of a device for accessing data/assets/application/services (DAAS). Various embodiments may use a machine learning technique (federated learning) for implementing an event and/or anomaly detection enabling a dynamic policy implementation. Based on the results of the learning agent, the policy engine might require additional CMFA verification for the identifier (assigned to a device) and/or authorize the device based on "deny all/permit with exception" in allowing a certain operation while denying other accesses and even revoking certain certificates. These and other techniques provide a distributed system of authentication and dynamic access control based on a decentralized identity system that is compatible with a zero trust reference architecture and facilitates implementation of the full set of zero trust controls and capabilities.

The disclosure additionally provides a distributed security architecture that avoids creating a single (or otherwise low number) point of failure as a target of security attacks in distributed networks such as military IoT networks. Systems according to the disclosure implement a decentralized identity structure that supports macro- and micro-segmentation, by granting access to devices with least privilege principles. The proof of privileges is implemented through distributed tamper-proof and verifiable certificates issued and/or revoked based on the goals and security rules of specific missions. The identity privacy of devices is guaranteed in the sense that eavesdropping authentication and access control message exchanges do not reveal the real identity and roles of devices in a mission. Systems according to the disclosure use an intelligent and dynamic security policy (using state-of-the-art AI/machine learning engines) in granting access to resources with fine-grained segmentation of operations. System architectures according to the disclosure include and facilitate further integration of full zero trust controls and capabilities. A related methodology uses hardware-in-the-loop network emulation, where the network edge is emulated with PCs connected in a local area network (LAN) and supporting a wide variety of connected resource-constraint devices.

Systems and methods of the disclosure mitigate the severity and scope of cyber-attacks by preempting unauthorized device accesses at an early stage. Systems according to the disclosure are scalable to support the vast expanse of enterprise and DoD information networks. The scalability and advanced authorization stems from the adoption of Zero Trust based distributed ledger technology and continuous multi-factor authorization. Additionally, stronger cybersecure information systems are a priority for enterprises beyond DoD to protect the intellectual and financial assets of organizations. The tiered trust zones in conjunction with an identifier (e.g., within a decentralized identity system) founded on an advanced AI/ML scheme help protect against untrusted access by reducing the attack surfaces. This feature enhances the data confidentiality and may be applied to contexts such as IT systems of banks, digital currency banking, cloud computing services, large-scale IT systems of universities/schools/medical facilities, online shopping retailers, etc. Unauthorized access to a remote device may be preempted by having the edge device validate its credentials via CMFA before executing a remote command.

The system includes an identifier, i.e., a decentralized digital identity, with verifiable credentials (VC) to enable privacy preservation, cryptographic "linkability" between real identity and credentials, tamper-proofing, and lightweight implementation. The privacy refers to preventing the real identity of a device and the associated credentials from being exposed to third parties-potentially adversaries eavesdropping the communication channels. The "linkability" property is the ability to verify the association of a claimed credential with the identifier of a device only by those network entities that conduct the verification task. Further, the policy decision point (PDP) of the network access control (NAC) can uniquely link the identifier and the VCs to a real device. The distributed identification system is tamper-proof in the sense that the certificates issued to a device cannot be modified by third parties (possibly adversaries); it can only be issued and revoked with the authorization of the NAC.

Systems and methodologies of the disclosure may be implemented such that they are mission aware. Based on a set of security policy rules and the goals of the mission, the NAC authorizes cryptographic certificates for a particular device, which correspond to various operations the device is allowed to conduct within the network for the mission. Systems according to the disclosure adopt a layered architecture that supports different roles of the device in the mission. Each role is a service endpoint associated with an identifier and an appropriate certificate issued to the device.

Figure 1:
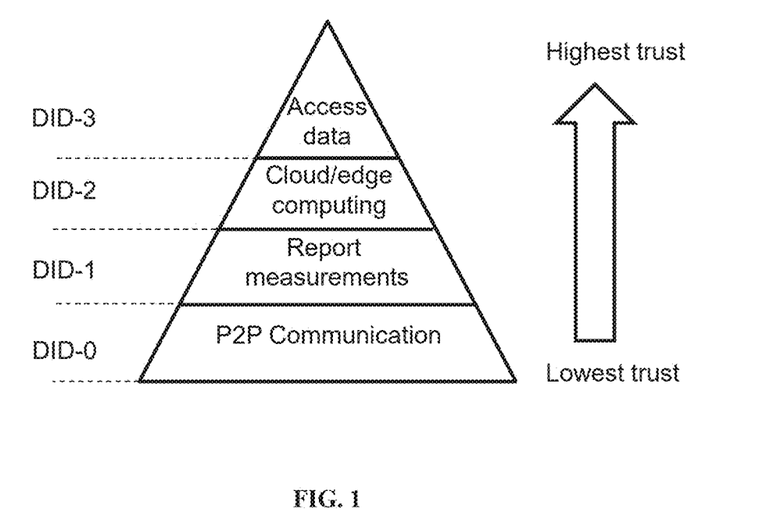
FIG. 1 shows a schematic view of a decentralized identity trust layers according to embodiments of the disclosure.

FIG. 1 provides an example of a layered identifier structure with different service endpoints. An identifier for a device in embodiments of the disclosure may be implemented via the illustrative hierarchy (and respective layers DID-0, DID-1, DID-2, DID3) shown in FIG. 1, or any other currently known or later developed arrangement. At the first layer, DID-0, a device may communicate with one or more peer devices in a network for information exchange (peer-to-peer, or "P2P") and/or distributed learning and communication. At the second layer, DID-1, a device may measure one or more aspects of the environment and report measurements to the network services. The third layer, DID-2, may access the network computing resources (either cloud, edge, or fog computing) which might be required by the devices to carry out one or more tasks in a mission. The top-most layer, DID-3, corresponds to accessing network databases and sensitive resources by particular devices. The example hierarchy has the flexibility to add more layers depending on security requirements and mission goals.

Figure 2:
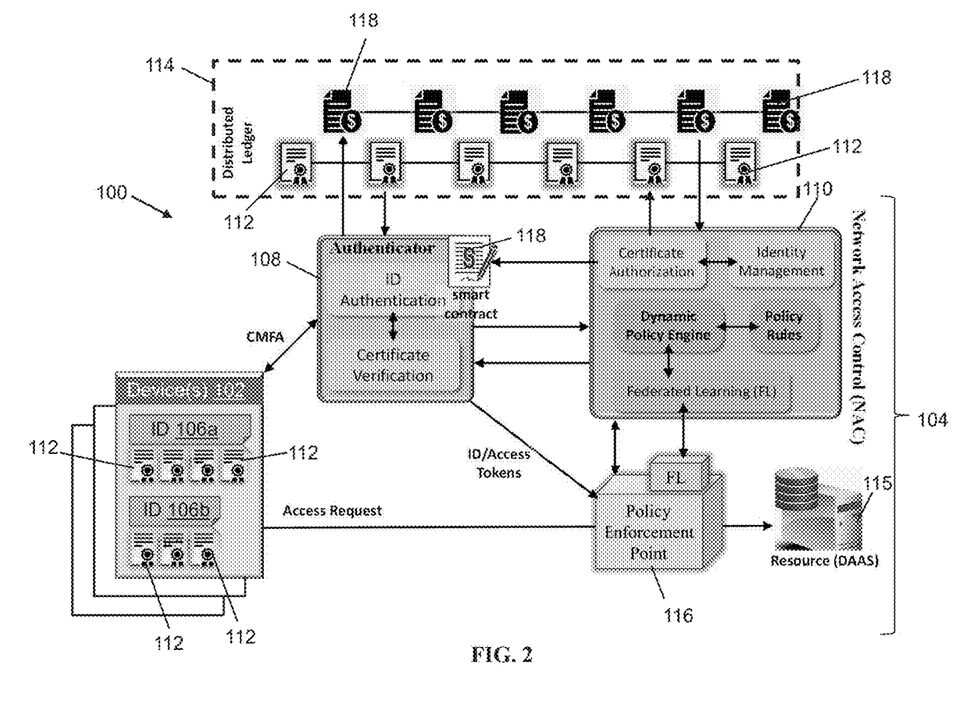
FIG. 2 depicts a distributed ledger for recording history of certificates and transactions according to embodiments of the disclosure.

FIG. 2 depicts a schematic diagram of a system 100, which may be implemented according to embodiments of the disclosure. System 100 depicts an example architecture of network access control (NAC) for authorizing one or more device(s) 102 in a network 104 via one or more identifier(s) 106 (two labeled "ID 106a," "106b" as an example) with a dynamic policy. The relationship between one or more device(s) 102 with identifier(s) 106 and an authenticator 108 are indicated in system 100 and discussed in detail herein. A network access control (NAC) component 110, e.g., included within a computing device as discussed herein, may provide various features such as certificate authorization, identity management, a dynamic policy engine, definition of policy rules, and a federated learning (FL) and/or other machine learning component. The identity management component of NAC component 110 processes information relating to identifier(s) 106, and links identifier(s) 106 with specific device(s) 102 within network 104. Based on the mission goals and security policy rules, the certificate authorization component of NAC component 110 authorizes issuance of cryptographic certificate(s) 112 (simply "certificates" hereafter) for identifier(s) 106 and gives permission to record certificate(s) 112 in a distributed ledger 114.

NAC component 110 may be configured to process authentication transactions from the distributed ledger 114 for authorizing device(s) 102 via identifier(s) 106 to access resources of network 104. The dynamic policy engine allows NAC component 110 to grant access to device(s) 102 associated with verified identifier(s) 106. The dynamic policy engine may receive and interpret information about the behavior of each device 102 from a policy enforcement point (PEP) engine 116 (i.e., another component of a computing device and/or another machine or component operating within network 104) for implementing dynamic policy decisions. The dynamic policy engine may employ a federated learning (FL) or other machine learning engine to learn and detect anomalies in the behavior of device(s) 102 operating within network 104. NAC component 110 also serves as an event detection component for one or more device(s) 102. Embodiments of the disclosure adopt a locally centralized and globally distributed architecture for event detection and response using a federated learning approach and/or other types of machine learning. PEP 116 engines at different segments and service providers locally implement learning agents on device(s) 102 for event and anomaly detection. The local learning agents are then combined in the FL engine of NAC component 110 to achieve a globally distributed (learning) policy for network 104.

System 100 provides security measures for responding to events and/or potential anomalies. The dynamic policy can be updated using a reinforcement learning approach by observing any deviation from security policy rules by device(s) 102, and/or compliance of device(s) 102 and/or identifier(s) 106 with the policy. Non-limiting examples of the policy rules are provided herein, but other policy rules can be defined by a user within the scope of this disclosure.

In one example of policy rules, if device(s) 102 and/or identifier(s) 106 change behavior abruptly, then NAC component 110 will request a CMFA via the identifier 106. Instances of abrupt changes may include, for example, one or more of the following: 1) abnormal increase in request by device(s) 102 to perform read operations on a database; 2) device(s) 102 with low computational requirements requesting large computational resources; or 3) abnormal increase in transaction frequency device(s) 102 for a specific mission (i.e., the number of transactions exceeds a threshold, time dependent and/or non-time dependent).

In another example of policy rules, if device(s) 102 make frequent movements between different segments of network 104, the dynamic policy engine of NAC component 110 requests authenticator(s) 108 to perform CMFA with multiple factors (e.g., several peer-to-peer CMFA and a specialized CFMA server).

In another example of policy rules, if an anomaly is detected in a network segment (e.g., heavier load than defined in the policy or frequent violative transaction requests), each active identifier(s) 106 in the network segment are required to pass CMFA for each access to the resource. The policy may require each identifier(s) 106 pass CMFA for each access to the resource until the anomaly is resolved.

In addition to the dynamic policy engine of NAC component 110, authenticator(s) 108 may use the activity history of identifier(s) 106 for further authentication. Activity history may include, for example, the number of signatures each identifier 106 received for its public key. Activity history of device(s) 102 may be encoded as a token in the certificate(s) 112 issued to the identifier(s) 106. In some embodiments, NAC component 110 may set rules for authenticating device(s) 102 via a smart contract 118 based on the activity history tokens encoded in the certificate(s) 112. Smart contract 118 may include a program stored on a blockchain configured to execute when predetermined conditions are met. Smart contracts are typically used to automate the execution of an agreement so that all participants can be immediately certain of the outcome, without any intermediary's involvement or time loss. Smart contracts may also automate a workflow, triggering subsequent actions when conditions are met. After a smart contract executes an action (e.g., releasing funds to appropriate parties), the blockchain is then updated when the transaction is completed. When authenticator(s) 108 attempts to verify the certificate(s) 112 of identifier(s) 106, authenticator(s) 108 may also retrieve a corresponding activity history. Based on the retrieved activity history and information within smart contract 118, authenticator(s) 108 may choose appropriate authentication steps and/or CMFA process to dynamically verify device(s) 102. The above discussion demonstrates the flexibility and generality of the proposed architecture of layered identifier and distributed authentication to infuse the full set of zero trust controls and capabilities.

Figure 3:
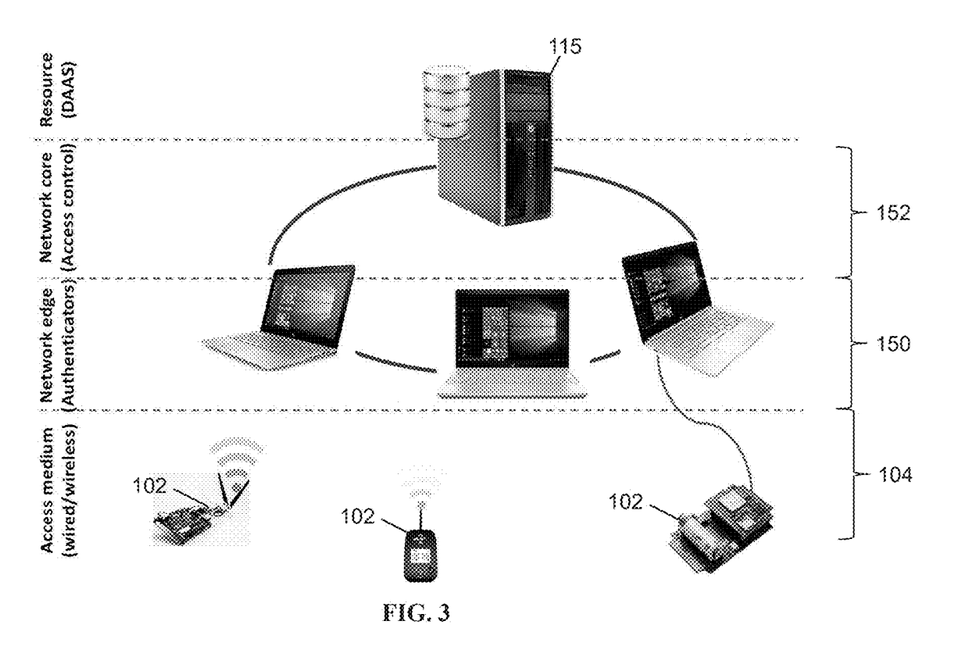
FIG. 3 depicts a schematic diagram of an emulated network environment according to embodiments of the disclosure.

Turning to FIG. 3, embodiments of the disclosure may further verify device(s) 102 in network 104 using an emulated network environment, in conjunction with further hardware. Relevant performance metrics for verification may include, as non-limiting examples, success rate in identifying authorized device(s) 102 and distinguishing non-authorized (or rogue) devices, success rate in authorizing device(s) 102 for fine-grained operations in accessing DAAS, communication overhead of verification, and computational overhead of security protocols on each device 102. Further evaluations may include latency of network 104 in secure access to resources.

As further shown in FIG. 3, embodiments of the disclosure may use a set of personal computers (PCs) 150, connected through a local area network (LAN) 152 that emulate the process of devices within network 104 performing distributed authentication, e.g., recording certificate(s) 112 and transactions on distributed ledger(s) 114, and connecting device(s) 102 to network resources 115. In this case, NAC component 110 comprising of network access control, policy engines and federated learning agents may be divided amongst separate devices (e.g., separate PCs 150 or otherwise distributed over LAN 152). It is also possible to use other types of devices (and software defined radios (SDRs)) with a wide range of computational capabilities and wireless/wireless connection ports in further implementations.

Embodiments of the disclosure provide an operational methodology capable of being implemented via system 100, device(s) 102, NAC component 110, and/or other interconnected components or networks (e.g., PC(s) 150 and LAN(s) 152 discussed herein). NAC component 110 may define conditions on the security state of device(s) 102 requiring services at different trust zones. The conditions could include software versions, patch level, security protocol suite, date/time/location and access medium (e.g., Bluetooth, Wi-Fi, LAN, etc.). Device(s) 102 may meet all requirements of a service endpoint at a given trust zone of network 104 to be eligible for using that service. In addition to the security state, the NAC component 110 also may use security policy rules corresponding to the specific mission in which device(s) 102 and/or network 104 operate. The policy rules can be set by the mission operator, e.g., directly via NAC component 110. Examples of the policies include denying access to certain resources through certain medium (e.g., Bluetooth connection), and denying read access to device(s) 102 that are intended to write measurement data.

Referring again to FIG. 2, device(s) 102 and NAC component 110 communicate to recognize identifier(s) 106 for every point of service in network 104. Device(s) 102 may use a key generation center (KGC) to generate a partial private key based on identifier(s) 106. The actual private key is then generated in device(s) 102 by combining the partial key with a secret. Device(s) 102 compute the corresponding public key which is signed in a web of trust (in the format of OpenPGP certificates) and sent to the NAC component 110. NAC component 110 requests appropriate authorities (e.g., one or more entities outside network 104 but in communication with NAC component 110) to issue certificate(s) 112 for identifier(s) 106 owned by each device 102, and the associated service endpoints. The certificate authorities may be any entity defined as trusted by the service provider(s) operating network 104. Certificate(s) 112 are recorded in distributed ledger 114, with a timestamp, authorization from NAC Component 110, and a cryptographic hash of the public key associated with identifier(s) 106. NAC component 110 can also revoke certificate(s) 112 under different conditions, including expiration time, detected anomalies or the mission termination.

Based on a desired or applicable security policy, NAC component 110 chooses an appropriate security protocol suite for authentication in different trust zones (e.g., DID-0, DID-1, DID-2, DID3 shown in FIG. 1 and discussed herein) of network 104. These chosen security protocols are recorded as smart contracts 118 in an "off chain" within distributed ledger 114. Authenticator(s) 108 (e.g., distributed authentication servers) use smart contracts 118 and the certificate(s) 112 information (recorded in ledger distributed ledger 114 in a previous step) to authenticate each device 102 having a respective identifier 106. The authentication transactions are recorded in distributed ledger 114 and include cryptographic certificate(s) 112. Each authentication transaction can output a "success," "retry," "failure" or "de-authentication" for each identifier 106, with metadata such as any applicable exceptions and/or timestamps. NAC component 110 uses authentication transactions in the authorization process. Embodiments of system 100 thus provide a layered approach which satisfies the desired properties outlined elsewhere herein.

System 100 and related methods enable macro- and micro-segmentation, as are the fundamental requirements of many reference architectures (e.g., the DoD "zero trust" framework). For every macro segment in network 104, an independent and respective identifier 106 is assigned to one device 102. The attributes of identifier 106 included in the associated certificate 112 define any prohibitions and/or granted privileges of device 104 in micro segments of network 104.

Identifier(s) 106 corresponding to different roles of device 102 (i.e., distinct identifier(s) 106a, 106b of FIG. 1) within network 104 are independent. Thus, the activity of each device 102 in one service layer (e.g., DID-0, DID-1, DID-2, DID-3 of FIG. 1 discussed herein) does not reveal information about the role of device 102 on other layers. As an example, other devices in a P2P communication layer can identify a specific device 102 (based on its identifier 106) while they are not aware of the activities of device 102 at higher layers (zero-knowledge proof).

The immutability of distributed ledger(s) 114 guarantees resistance against tampering (by an adversary) for the public key and certificate(s) 112 associated with each identifier 106. Furthermore, registering new identifier(s) 106 requires signatures from a web of trust (for the associated public key), signatures from certificate-issuing authorities (for the associated service endpoint), and authorization by NAC component 110.

The entities within network 104 (e.g., various device(s) 102, authenticator(s) 108, etc.) are given only partial information about other device(s) 102 necessary to verify the privileges for each device 102 and authorize access to DAAS resources 115 of network 104. All network entities (e.g., device(s) 102, authenticator(s) 108, etc.) might not require the full identity of a device 102 to perform respective functions. For example, fog computing servers having hierarchies such as those shown in FIG. 1 do not need identifier(s) 106 for certain device(s) 102 at the higher trust levels. However, NAC component 110 provides servers operating within network 104 and/or otherwise in communication with network 104 with identifier(s) 106 of each device 102 at lower layers.

Device(s) 102 may be authenticated independently of each other at different segments of network 104. The failure of a single authenticator 108 in network 104 thus does not result in the failure of network 104 itself. The credentials and private keys associated with identifier(s) 106 of each device 102 need not be stored in central servers. Consequently, the confidentiality of identifier(s) 106 is maintained if some servers are compromised. Furthermore, due to segmentation and distributed authorization, one device 102 being compromised does not affect the continued viability of network 104. Separate identifier(s) 106 may be assigned to device(s) 102 for the operations at every (macro) segment of network 104. The attributes of each identifier 106 define the privileges of that device 102 in its segment of network 104 (i.e., micro-segmentation). The attributes are included in certificate(s) 112 issued by trust authorities and authorized by NAC component 110. Every identifier 106 also may be associated with a pair of public-private keys. Certificate(s) 112 may be recorded in a Merkle Patricia Tree (MPT) data structure. The MPT data structures are composed of three types of leaf, branch, and extension nodes. Every leaf node is characterized by a "key"–"value" pair. The leaf nodes of the MPT store certificate(s) 112 associated with a given identifier 106. The "key" of a leaf node is the cryptographic hash of the associated public key, and the "value" indicates certificate 112.

Figure 4:
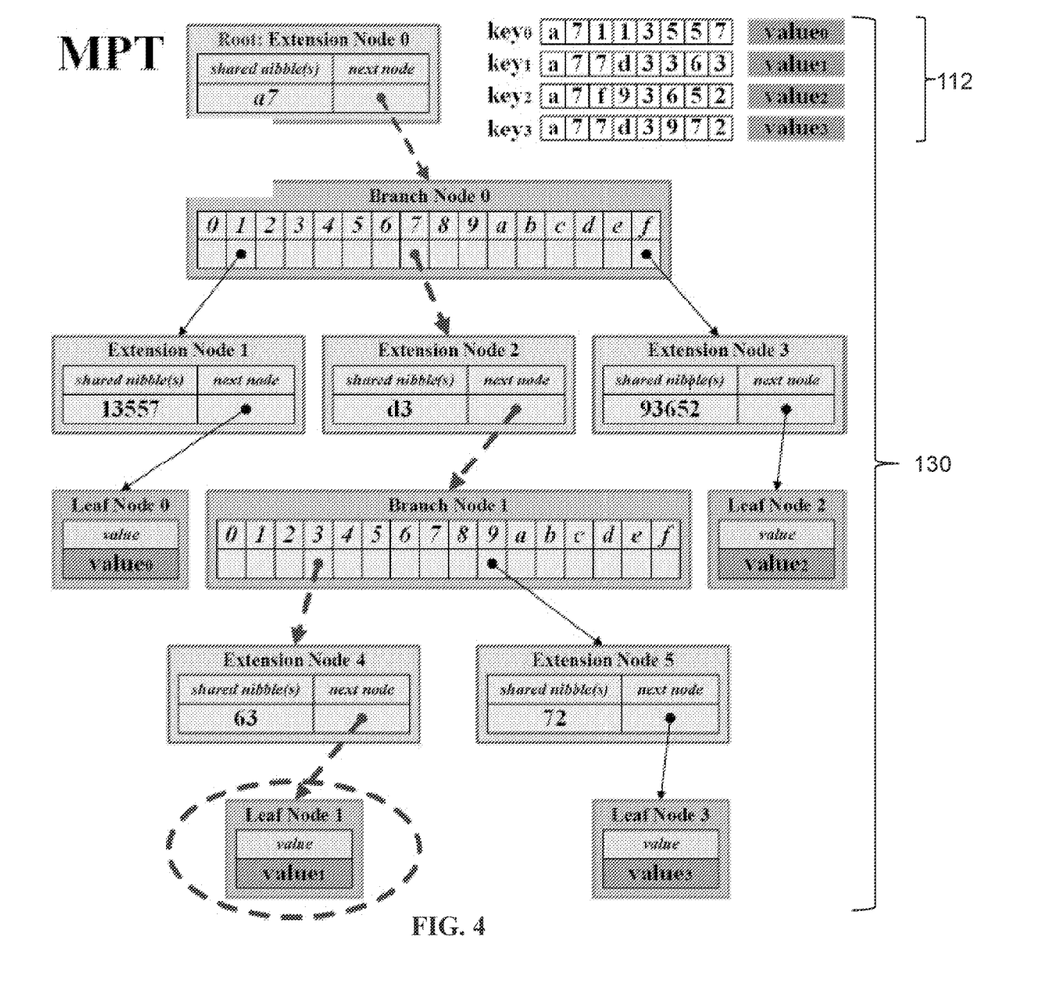
FIG. 4 shows a schematic view of a Merkle Patricia Tree (MTP) data structure for storing certificates associated with a decentralized identity data structure according to embodiments of the disclosure.

Referring to FIG. 4, an example of a Markle Patricia Tree data structure (simply "data tree" hereafter) 130 including certificates 112 for four identifiers 106 (FIG. 2) is discussed. The existence and integrity of a certificate (access privilege granted to a device/identifier) can be verified by finding the corresponding leaf node in data tree 130. The leaf node can be found using the cryptographic hash of the public key associated with a respective identifier. In the example of FIG. 4, four certificates 112 are issued to four different devices 102 (FIG. 2). To verify whether each certificate 112 is issued to one device 102 under examination, methods of the disclosure include first calculating the cryptographic hash of the corresponding public key which is equal to "key1" in the example. Since there exists a node (i.e., "leaf node 1") with the corresponding public key (key1), it implies that the device 102 under examination has been granted a certificate 112. The content of the node then shows which privileges the device 102 is granted (with a timestamp showing the validity period), e.g., to determine which operations are permitted or not permitted by device 102 in network 104.

Data tree 130 in the format of an MPT leverages a popular data structure capable of being authenticated with cryptographic security. The root cryptographic hash provides a proof that a leaf node (public key and certificate(s) 112 associated with, e.g., a particular identifier 106) exists. A public key and/or certificate 112 for each device 102 cannot be forged by an adversary as the existence of such attributes changes the cryptographic hash values for multiple nodes across the entire tree. In the example of FIG. 4, by calculating the cryptographic hash of branch node 0, extension node 1 and leaf node 0, and comparing against the root hash, the existence of certificate 0 is verified. Furthermore, the root hash is a proof for the integrity of the issued certificate 112 since the hash of the certificate is propagated to the root of the tree.

Figure 5:
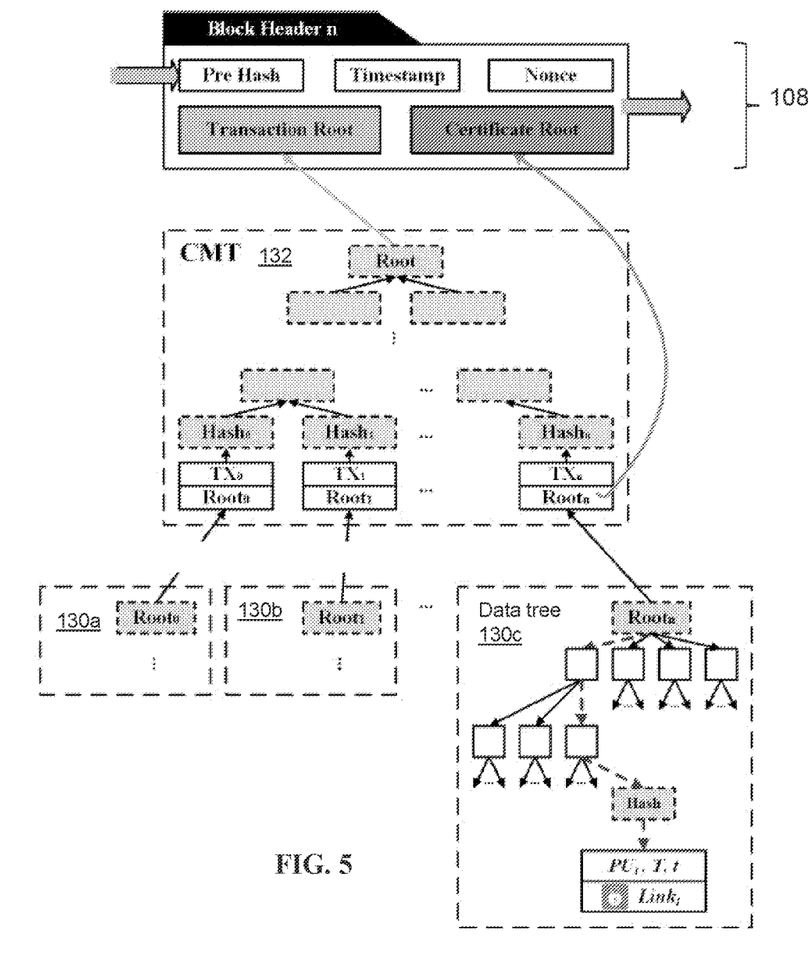
FIG. 5 depicts a schematic diagram of a distributed ledger system for recording transactions of certificates issuance and revocation according to embodiments of the disclosure.

Turning now to FIG. 5, one of multiple data trees 130 (separately identified as "130*a*," "130*b*," "130*c*") may be used by authenticator 108 to record identifier(s) 106 for each device 102 that has been authenticated and remains active in network 104 (FIG. 2). At any time, when an authentication request is sent to authenticator 108, authenticator 108 verifies the existence (and activity) of identifier 106 in the network by referring to data tree 130*a*. Further, authenticator 108 verifies the existence of appropriate certificate(s) 112 in one data tree 130 (e.g., third data tree 130*c* in the FIG. 5 example). Each leaf node of one data tree 130 is the root cryptographic hash, e.g., of a related data tree 132 (e.g., a chronical Merkle tree (CMT)) that records all authentication transactions corresponding to identifier 106. As noted herein, the authentication transaction can be designated a success, retry, failure or de-authentication. The authentication transactions, with the corresponding root cryptographic hash of one data tree 130, are recorded in distributed ledger 114 by authenticator(s) 108. Additionally, all certificate transactions (issuance or revocation) with the corresponding root cryptographic hash of one data tree 130 (e.g., data tree 130*c* in FIG. 5 example) are written to distributed ledger 114 by the certificate-generating authority(ies).

While data tree 130 provides a framework for proof for existence and integrity of identifier(s) 106 and associated certificate(s) 112, distributed ledger 114 records the activities of certificate authorities and authenticator(s) 108. When a certificate authority issues or revokes certificate(s) 112 (e.g., as authorized by the NAC component 110) an issuance or revocation transaction with the updated root cryptographic hash of data tree 130 is recorded in distributed ledger 114 and broadcast to authenticator(s) 108. Further, the authentication transactions, and the updated root cryptographic hash of data tree 130, are written to distributed ledger 114 and broadcast to the certificate authority(ies).

In addition to being usable with the various example mechanisms discussed herein, distributed ledger 114 further facilitates implementing networks 104 with "zero trust" controls. The history of certificate(s) 112 revoked and/or issued to different identifier(s) 106 (and corresponding device(s) 102) can be used by authenticator(s) 108 in continuous multi-factor authentication (CMFA). The history of authentication transactions, on the other hand, can serve as additional authorization data used by the service providers, certificate authorities and NAC component 110 for security analytics and granting access to device(s) 102.

Figure 6:
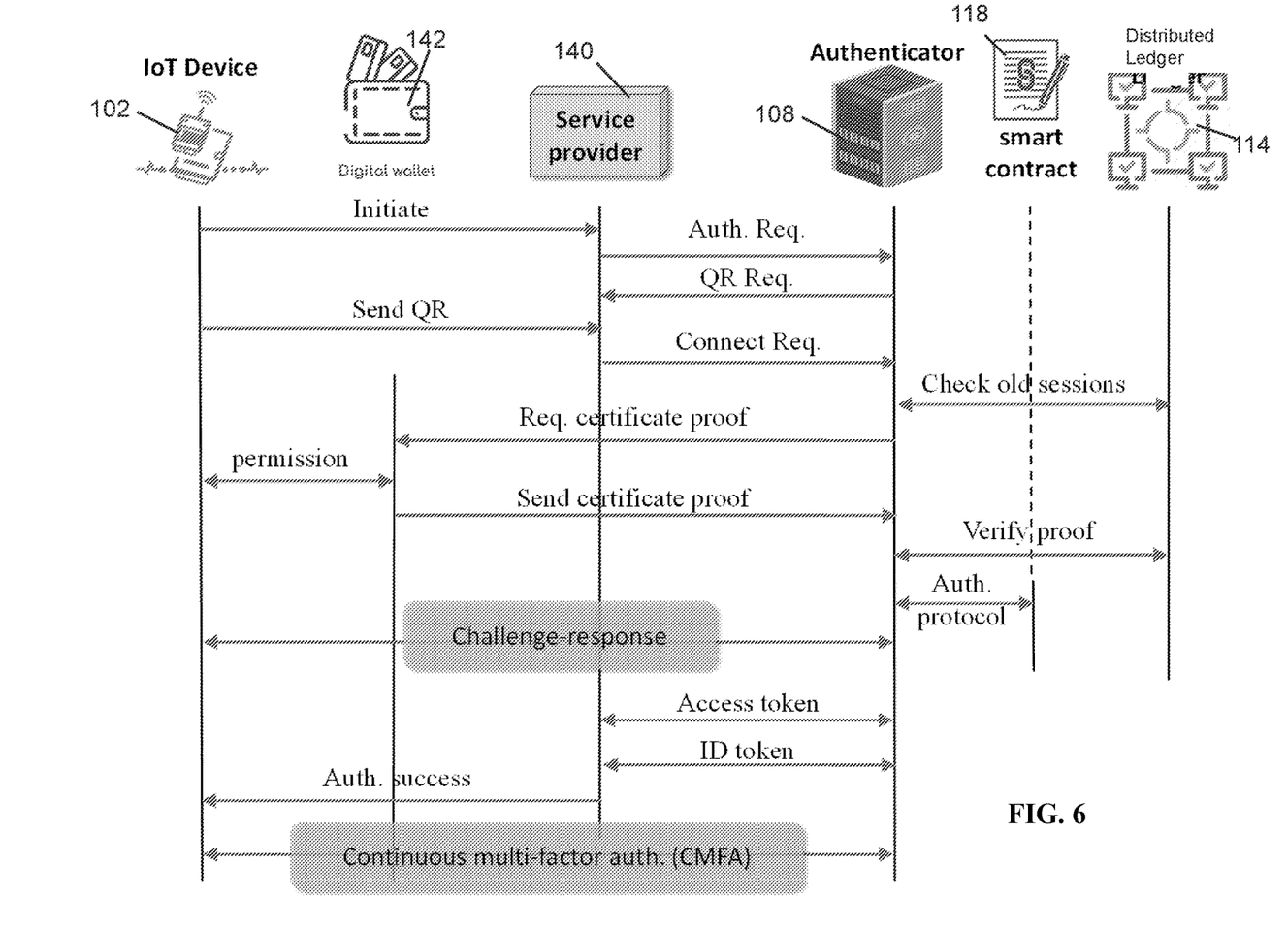
FIG. 6 depicts a distributed authentication protocol for identifying new devices with proof of certificate and continuous multi-factor authentication (CMFA) according to embodiments of the disclosure.

Multi-factor authentication (MFA) may provide enhanced access security. It also has proven compatible with zero trust reference architectures. However, existing MFA technologies have been developed for human subjects using hardware/software tokens and/or biometrics. Embodiments of the disclosure provide a continuous MFA (CMFA) for machine (i.e., device 102) authentication. The layered identifier and the distributed ledger technologies described herein may provide an improved implementation of the CMFA mechanism. An example operational methodology for an authentication protocol based on distributed ledger 114 smart contracts 118 is shown in FIG. 6. In this example diagram, device 102 requests access to a network resource (DAAS) 115 (FIG. 2) which is managed by a service provider 140. Device 102 may have already been certified for accessing the resource (i.e., it has been granted certificate(s) 112 for access).

During operation, device 102 may send an initial request to service provider 140 to access a resource. Service provider 140 responds by sending an authentication request to authenticator(s) 108. In another process, authenticator(s) 108 requests a QR code or other data representing identifier(s) 106 and any associated attributes for device(s) 102. The QR code, where applicable, may be s a cryptographic hash of identifier 106 and its associated attributes. Device 102 then may send the QR code to service provider 140. Service provider 140 then may request a connection to authenticator 108. Authenticator 108 checks for the possible existence and activity of the identifier 106 in distributed ledger 114 (e.g., via data tree 130 therein). If identifier 106 does not exist and is not already active within network 104, authenticator 108 connects to device 102.

In another process, authenticator 108 device 102 to provide proof of certificate(s) 112 associated with the access request. The proof may be provided, e.g., as the signature of certificate 112 issued to identifier 106 for accessing resource 115. In this case, the signature has previously been provided to device 102 and in certificate 112 recorded within distributed ledger 114.

In still further processing, lightweight and resource-constraint device(s) 102 might use edge computing services and databases, e.g., a digital wallet 142, to store and manage identifier(s) 106, certificate(s) 112, and any required cryptographic primitives. In this case, authenticator 108 may request proof of certificate(s) 112 from digital wallet 142. Before responding to such requests, digital wallet 142 may request the permission of device 102 to transmit relevant certificate(s) 112. The channel between digital wallet 142 and device 102 may be securable using pre-shared secret keys and/or any other currently known or later developed security mechanism.

In another process, device 102 (or digital wallet 142) may send the certificate 112 as proof to authenticator 108. Authenticator 108 then may verify the existence, integrity, and validity of certificate 112 by referring to distributed ledger 114, e.g., data tree(s) 130 (FIG. 5) thereof.

In still further processing, authenticator 108 chooses the appropriate authentication protocol from smart contract(s) 118. The smart contract(s) 118 may be stored, e.g., in an off-chain ledger shared between service provider(s) 140 and authenticator(s) 108, as may be authorized by NAC component 110. Smart contract 118 may include an authentication mechanism (2-way or 4-way challenge-response) and security protocol suite (e.g., required cryptographic primitives) as agreed upon based on the security requirements of a trust zone. Smart contract(s) 118 can be used as enforced policy rules in a zero trust architecture.

After choosing an appropriate security protocol suite, authenticator 108 may initiate a challenge-response protocol with the device(s) 102 under examination. In a four-way security protocol, device 102 verifies the authenticity of authenticator 108 itself while also demonstrating its own authenticity (e.g., according to processes discussed herein). If the authentication is successful, authenticator 108 in additional processing sends identifier 106 and access tokens to service provider 140. The access token, when included, may provide all claims that device 102 (or the corresponding identifier 106) can make about its own identity. The access token shows the privileges for which device 102 (and identifier 106) is authorized, thus defining operations that are permitted and not permitted by device 102 in network 104.

After receiving the tokens, service provider 140 in further processing may inform device(s) 102 of whether the authentication succeeded or failed. Service provider 140 might further require multi-factor authentication (MFA) for authorizing device 102. This requirement is available, e.g., in smart contract 118. Hence, authenticators 108 can follow the above process with MFA. The MFA process will continue regularly until the end of the active session (CMFA).

Figure 7:
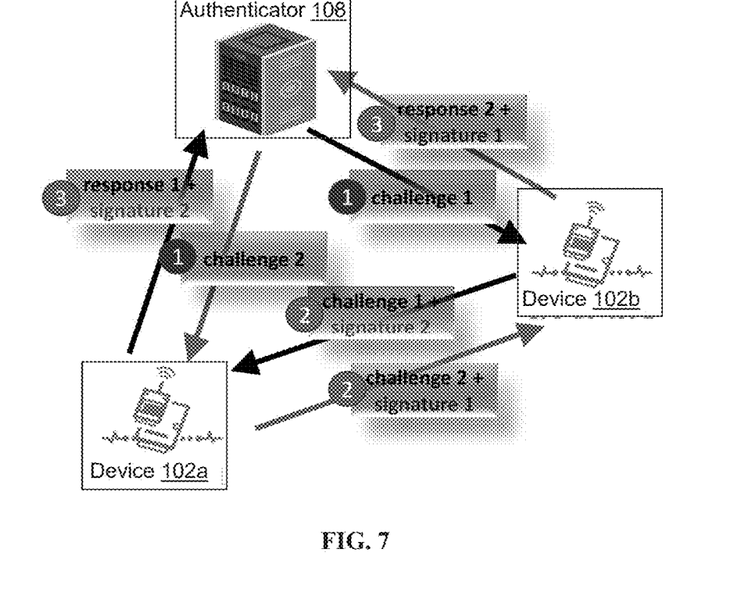
FIG. 7 depicts a schematic view of an example authenticator initiating process of peer-to-peer (P2P) multi-factor authentication according to embodiments of the disclosure.

Turning to FIG. 7, embodiments of the disclosure may provide various forms of CMFA for device(s) 102. Specifically, CMFA may be provided through multiple mechanisms such as: 1) peer-to-peer, 2) inter-identifier, and 3) specialized identifier. In peer-to-peer CMFA, multiple device(s) 102 perform a mutual authentication process on each other, initiated by authenticator(s) 108. The inter-identifier mechanism can be used for devices with multiple identifier(s) 106 (associated with different network segments and/or connection media of the device). NAC component 110 can also define one or more specialized identifier(s) 106 for device(s) 102 which are specifically used for CMFA. Specialized identifier(s) 106 may be used by CMFA servers specifically to exchange challenge-response with device(s) 102 at the request of authenticator(s) 108.

According to the FIG. 7 example, it may be assumed that device 102a has successfully completed the initial authentication phase (as shown in FIG. 6) and device 102b has already been authenticated, authenticator 108 sends a first challenge (for authenticating device 102a) to device 102b. Similarly, a second challenge is sent to device 102a. Upon receiving a challenge, every device 102 signs and sends the challenge to the corresponding device 102 (device 102a sends the challenge to device 102b and vice versa). The signatures are used to ensure nonrepudiation. After receiving the proper challenge, each device 102a, 102b generates the corresponding response for authenticator 108. Thereafter, each device 102 sends the response along with the signature of the other device 102 to authenticator 108. The response of device 102a is verified as an MFA factor. Further, the signature of device 102b sent along with the response of device 102a is a proof that device 102a has received the first challenge from an authentic device (e.g., to prevent a man-in-the-middle attack). The signature of device 102a sent to authenticator 108 by device 102b is an additional factor for authenticity of device 102a. While this process can be used as an MFA factor for authenticating device 102a, it also provides an authenticity proof for device 102b (CMFA).

An advantage of peer-to-peer CMFA is that participating devices 102 construct a web of trust. Every device 102 participating proves its own authenticity while it helps authenticate a peer device 102. Authenticator(s) 108 can use such a web of trust as an additional mechanism for CMFA. Rather than initiating a challenge-response process, authenticator 108 might request active devices to perform their own challenge-response process regularly. The number of signatures every device 102 receives from its peers can be used as a proof of authentication (e.g., similar to proof of work in distributed ledger technologies).

Alternative CMFA mechanisms include inter-identifier and specialized identifier systems. Inter-identifier approaches are suitable for device(s) 102 with more than one identifier 106 (at different network segments). Specialized identifier systems employ specialized CMFA servers and identifier(s) 106 for additional authentication factors. In an example, one device 102 has multiple identifiers 106 (e.g., identifiers 106a, 106b (FIG. 2)). Device 102 might be represented by identifiers at different network segments, or it can have a single identifier 106, in which case device 102 is assigned a second identifier 106 for identifying to CMFA servers. For authenticating identifier 106a, a challenge is sent to device 102a with a destination for identifier 106b. If the device is not legitimate, it might not know that 106b also belongs to the same device 102a with identifier 106a (due to the privacy property of identifiers 106). Hence, if device 102a looks for the owner of identifier 106b, it is readily detected as an adversary. However, a legitimate device, which receives the challenge destined for identifier 106b, first signs the challenge with identifier 106b. Next, device 102a generates the response to the challenge. Device 102a then sends the signature and the response to authenticator 108. In this way, both the authenticity of device 102a and its two identifiers are verified. It is noted that even if an adversary knows that both identifiers belong to the same device, it requires the secret credentials corresponding to both identifiers (including private and public keys and shared secrets) to forge the response and signatures.

Figure 8:
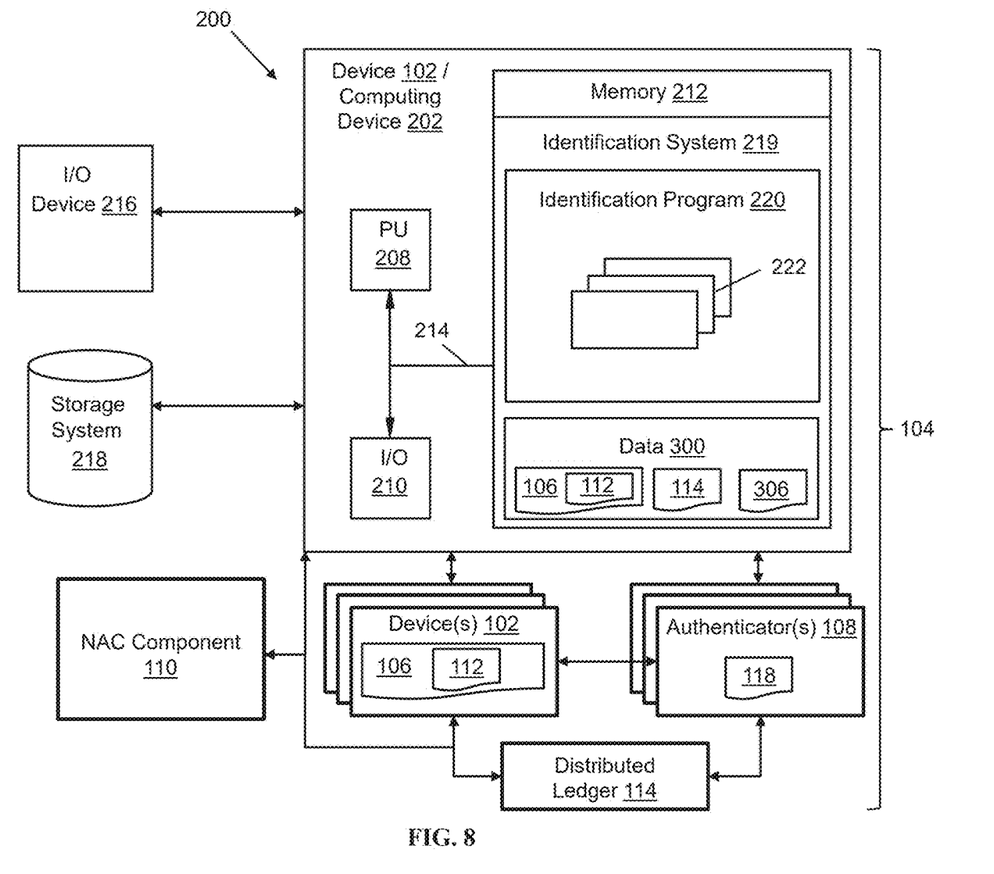
FIG. 8 depicts an illustrative environment including a computer system and components for providing distributed authentication and dynamic authorization according to embodiments of the disclosure.

Referring to FIGS. 2 and 8, an illustrative environment 200 for implementing embodiments of system 100 using one or more computing devices 202 is described. Computing device 202 may be included within and/or may be embodied as one or more device(s) 102 as discussed elsewhere herein. Environment 200 may include a computing device 202, which may be integrated within device 102 or simply may be embodied as one device 102 within network 104. Device 102 and/or computing device 202, where applicable, may be in communication with at least one other device 102 and/or authenticator(s) 108, and furthermore may be communicatively coupled to NAC component 110 discussed herein. Other device(s) 102, authenticator(s) 108, and/or NAC component 110 themselves also may be implemented on, and/or may be coupled to computing devices having a similar hardware architecture to computing device 202, with various distinct hardware and/or software features for implementing respective functions. Each component of environment 200 additionally may be in communication with distributed ledger 114 as discussed elsewhere herein.

As discussed herein, device(s) 102 and/or computing device(s) 202 may cooperate with other components to implement decentralized authentication of devices seeking to operate within network 104. Each device 102 and/or computing device 202 may include a processor unit (PU) 208, an input/output (I/O) interface 210, a memory 212, and a bus 214. Further, the computing device 202 is shown in communication with an external I/O device 216 and a storage system 218. The external I/O device 216 may be embodied as any component allowing user interaction with the computing device 202. An identification system 219 may be included wholly or partially within the memory 212 of the computing device 202.

Identification system 219 can execute an identification program 220, which in turn can include various modules 222, e.g., one or more software components configured to perform different actions, including without limitation: a calculator, a determinator, a comparator, etc. The modules 222 can implement any currently known or later developed analysis technique for interacting with other components of network 104, e.g., by cooperating with authenticator(s) 108 such that computing device 202 itself is authenticated, and/or by interacting with other device(s) 102 for independent authentication after computing device 202 is admitted to network 104.

Modules 222 of identification system 219 can use calculations, look up tables, and similar tools stored in the memory 212 for processing, analyzing, and operating on data to perform their respective functions. In general, the PU 208 can execute computer program code, such as identification program 220, which can be stored in memory 212 and/or storage system 218. Memory 212 and/or storage system 218 thus may represent any suitable memory or storage device (internal, external, cloud-based, and so on) on and/or associated with identification system 219 and may be configured to be interacted with by a user of identification system 219 for providing communication capabilities and/or information to the user, e.g., via I/O interface 210 and/or various I/O controllers. While executing computer program code, PU 208 can read and/or write data to or from memory 212, storage system 218, and/or I/O interface 210. Bus 214 can provide a communications link between each of the components in computing device 202. I/O device 216 can comprise any device that enables a user to interact with computing device 202 or any device that enables computing device 202 to communicate with the components described herein and/or other computing devices. I/O device 216 (including but not limited to keyboards, displays, pointing devices, etc.) can be coupled to device(s) 102, authenticator(s) 108, etc. either directly or through intervening I/O controllers (not shown).

Memory 212 can include a cache of data 300 organized for reference by identification system 219. As discussed elsewhere herein, the computing device 202 can send, receive, and/or rely various types of data 300, including metadata pertaining to other device(s) 102 operating within network 104 or attempting to be authenticated within network 104. Data 300 thus may be classified into multiple fields and, where desired, sub-fields within each field of data 300. The data 300 may be provided to and/or from other device(s) 102, authenticator(s) 108, e.g., via connections through network 104 and/or I/O device 216. To exchange data between multiple devices within network 104, computing device 202 may be communicatively connected to one or more devices, communication services, and/or wireless network interfaces. In some cases, these communication features may also be contained within memory 212 of computing device 202.

Data 300 can optionally be organized into a group of fields. In some cases, data 300 may include various fields indicative of data used for authentication and/or operating within network 104. For example, the data 300 may include one or more identifier(s) 106 discussed herein. Identifier(s) 106 may include cryptographic certificate(s) 112 for verifying access rights and/or permitted operations within certain hierarchical levels of network 104 (e.g., those shown in FIG. 1 and discussed herein). In an example embodiment, data 300 of memory 212 may include a copy of distributed ledger 114, and/or otherwise may include data for communicating with instances of distributed ledger 114 that are external to computing device 202. The data 300 may also include transaction metadata 306 including, e.g., spatial, temporal, spectral, and security characteristics of network 104. In an example embodiment, identification system 219 is configured to store the transaction metadata 306 as data 300 within memory 212. Data 300 may also include other types of data, e.g., regulatory and stakeholder metadata (simply "regulatory metadata" hereafter), e.g., various types of information provided by and/or within NAC component 110 such as access rules and/or decisions, user requirements, and others, when such data is not stored within and/or accessible from NAC component 110.

Each type of data 300, however embodied, may be accessible to identification program 220. The data 300 may be mixed and parsed using the identification program 220 as it interfaces with a local static database, e.g., via the internet, to store regulatory and stakeholder access decisions. Such decisions may remain available to identification program 220 as data 300, which may be used for reference to authenticate device(s) 102 within network 104 (e.g., via authenticator 108). The identification program 220 thus may output data to be interpreted by authenticator 108, and once authenticated at a corresponding level within network 104, may send and receive data for authenticating other device(s) 102.

Figure 9:
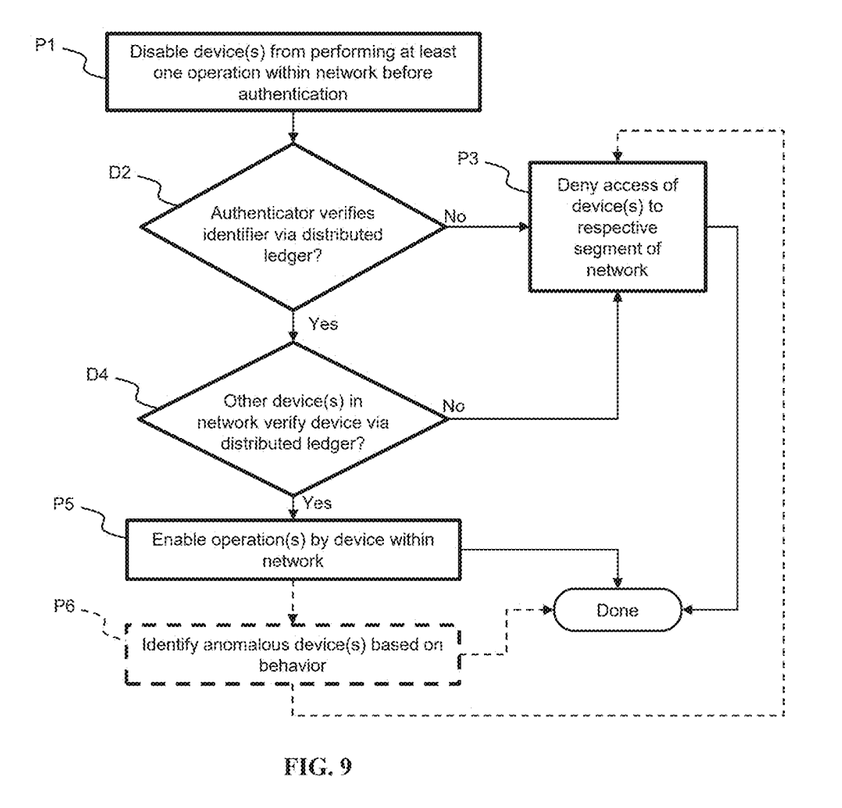
FIG. 9 depicts an illustrative flow diagram for implementing methods according to embodiments of the disclosure.

Referring now to FIG. 9 and with further reference to FIGS. 1 and 8, embodiments of the system 100 and/or environment 200 may also be used to implement various methods according to embodiments of the disclosure. Initially, authenticator 108, NAC component 110, and/or other portions of network 104 may detect non-authenticated device(s) 102 attempting to communicate with network 104. Process P1 of the disclosure my include, upon detecting a non-authenticated device, disabling such device(s) 102 from performing at least one operation within network 104. The disabling in process P1 may include, e.g., preventing one or more detected device(s) 102 from requesting certain types of information from other device(s) 102 such as data pertaining to hierarchical levels (e.g., DID-0, DID-1, DID-2, DID3 of FIG. 1) requiring requisite authentication. Device 102, however, may include identifier(s) 106 discussed herein. Methods of the disclosure may enable NAC component 110 and/or other device(s) 102 to authenticate device 102 using identifier(s) 106, thus enabling authenticated device(s) 102 to perform certain operations within network 104.

Further processing my implement one or more verification techniques described herein. In decision D2, authenticator 108 may first verify an identity of device 102 using identifier 106 therein, in conjunction with distributed ledger 114. The verification may include, e.g., authenticator 108 transmitting challenges to device(s) 102 within network 104 and detecting a response to the challenge from each device 102. In further implementations, authenticator 108 may use continuous multi-factor authentication to verify and re-verify the identity of device(s) 102 using one or multiple identifier(s) 106 thereof, as well as certificate(s) 112. In decision D2, authenticator 108 may consult distributed ledger 114 to record and/or confirm an authentication transaction for device(s) 102. Distributed ledger 114 may include, e.g., data tree 130 (FIGS. 4, 5), related data tree(s) 132, etc., and/or other approaches to organize a history of transactions discussed herein, and/or other types of distributed ledgers currently known or later developed. In the cases where authenticator 108 cannot verify identifier(s) 106 of device 102 (i.e., "no" at decision D2), the method may continue to process P3 of denying access to a respective segment of network 104. In cases where authenticator 108 verifies identifier(s) 106 of device 102 using distributed ledger 114 (i.e., "yes" at decision D2), the method may proceed to further verification processes.

In decision D4, device(s) 102 in network 104 may independently verify or re-verify the identifier(s) 106 of other device(s) 102 in network 104. The verification in process D4 may include, e.g., device(s) 102 transmitting challenges and responses to each other, optionally as directed via authenticator 108 and/or NAC component 110. Such verifications may also be conducted with the aid of distributed ledger 114, and device(s) 102 may have communicative access to distributed ledger to perform the verifying in decision D4. Optionally, the verifying in decision D3 may be implemented by requesting certificate 112 and an access token from digital wallet 142 (FIG. 6) as discussed herein. In cases where a device 102 and/or identifier is not second verified using other device(s) 102 (i.e., "no" at decision D4), the method may continue to process P3 as discussed elsewhere herein. In cases where device(s) 102 are second verified via other device(s) 102 and distributed ledger 114 (i.e., "Yes at decision D4), the method may continue to other processes. In implementations with a hierarchical network 104 structure, the one or more device(s) 102 may be denied access to some segments of network 104 (e.g., due to having at least one non-verified identifier 106) but granted access to other segments of network 104 (i.e., by having at least one verified identifier 106). In such cases, P3 can be implemented in parallel with other subsequent processes P5, P6 discussed herein.

According to various embodiments, decision D2, D4 each may include additional operations implemented using device(s) 102 and/or authenticator(s) 108. The verifying of a device may include, e.g., initially determining whether identifier(s) 106 of device(s) 102 under analysis have corresponding activity within distributed ledger 114. This may be determined based on transactional data within distributed ledger 114, e.g., represented in data tree(s) 130. If device(s) 102 and/or authenticator 108 do not find corresponding data in distributed ledger 114, they may request device(s) 102 to provide certificate(s) 112 instead of simply concluding that the device(s) 102 do not have the correct privileges. Regardless of whether identifier(s) 106 have corresponding data in distributed ledger 114, or a correct certificate 112 is provided and verified, device(s) 102 and/or authenticator 108 may then admit device(s) 102 to network 104.

In process P5, authenticator 108 and/or NAC component 110 may enable device(s) 102 with verifier identifier(s) 106 to perform one or more corresponding operations within network 104. Such operations may correspond to a particular hierarchical level, e.g., any of levels DID-0, DID-1, DID-2, DID-3 shown in FIG. 1 and discussed herein. Optionally, process P5 may include admitting device(s) 102 to network 104 by transmitting an access token (e.g., to digital wallet 142 (FIG. 6) and/or additional identifier(s) 106 to the verified device(s) 102. After the verifying in decisions D3, D4 and subsequent actions in processes P4, P5 conclude, the method may end ("Done"), or may be repeated to authenticate or re-authenticate other device(s) 102 in network 104. In some implementations, an additional process P6 may include identifying anomalous device(s) 102 within network 104, whether or not they have been authenticated and/or permitted to perform operations within network 104. The identifying of anomalous device(s) 102 may be based on machine learning components (e.g., the federated learning engine discussed elsewhere herein) within NAC component 110, policy enforcement point (PEP) 116 (FIG. 2), and/or other components discussed herein. In some cases, methods of the disclosure may include implanting process P3 to disable one or more operations by anomalous device(s) 102 even after they have been authenticated and granted certain privileges within network 104.

Embodiments of the disclosure provide various technical and commercial advantages, examples of which are discussed herein. The security system in embodiments of the disclosure can preserve the identity privacy of IoT devices, guarantees least privileges, and prevents a single point of failure from existing on the network. Embodiments of the disclosure allow easy and fast integration of existing security protocols (with well-studied security proofs) while introducing new innovative features such as continuous multi-factor authentication and dynamic policy for authorization. The distributed architecture of systems according to the disclosure allows fine-grained micro-segmentation for authorizing devices in accessing network resources and facilitates integration of the full zero trust controls and capabilities in next maturity levels of the technology.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. A system comprising:
   a device within a network of devices, wherein each of the devices comprise a computer processor and memory;
   an identifier within the device and having a cryptographic certificate, wherein the device is configured to transmit the identifier to an authenticator as a security proof, and wherein the authenticator comprises a computer processor and memory, wherein the authenticator enables the device to operate on the network subject to a network policy, wherein the network policy disables the device from performing at least one operation within the network before verifying an identity of the device via the identifier and using a distributed ledger; and
   a federated learning engine implemented on a plurality of other devices in the network of devices, and in communication with the device, wherein the federated learning engine is configured to determine whether the device is authorized in response to an attempted policy-violative behavior of the device within the network, wherein the federated learning engine is configured to determine whether the device is authorized based on a continuous multi-factor authentication (CMFA) and an activity history of the device within the network.

2. The system of claim 1, wherein the identifier and the cryptographic certificate define a permitted operation and a non-permitted operation for the device while within the network.

3. The system of claim 1, wherein the federated learning engine is further configured to determine whether the device is anomalous based on a behavior of the device within the network, observed via at least one of the plurality of other devices in the network of devices.

4. The system of claim 1, wherein the authenticator includes a distributed ledger for authenticating devices based on each identifier within the network, and wherein the distributed ledger includes at least one of an authentication log, a network access log, and a record of transaction associated with the identifier on the distributed ledger.

5. The system of claim 1, wherein the identifier includes a cryptographic hash of an identifier of the device and an attribute of the device.

6. A system for authenticating a device within a network of devices, the system comprising:
- an identifier within a device of the network, and having a cryptographic certificate; and
- a different device of the network in communication with the device, wherein the different device comprises a computer processor and memory, the memory storing instructions for an authenticator, the different device performs actions including:
  - enabling the device to operate on the network subject to a network policy, wherein the network policy disables the device from performing at least one operation within the network before verifying an identity of the device via the identifier,
  - first verifying an identity of the device within the network based on the identifier and using a distributed ledger,
  - second verifying the identity of the device based on authentication by a federated learning engine implemented on other devices within the network and in communication with the device using the distributed ledger, wherein the federated learning engine is configured to perform the second verifying of the identity of the device in response to an attempted policy-violative behavior of the device within the network, based on a continuous multi-factor authentication (CMFA) and an activity history of the device within the network.

7. The system of claim 6, wherein the identifier and the cryptographic certificate defines the disabled at least one operation for the device while within the network.

8. The system of claim 6, wherein the different device is further configured to:
- determine whether the identifier has corresponding activity in the distributed ledger;
- request the cryptographic certificate within the distributed ledger, in response to the identifier not having corresponding activity in the distributed ledger; and
- admit the device to the network by verifying at least one of the cryptographic certificate or the identifier.

9. The system of claim 8, wherein the different device is further configured to request the cryptographic certificate by requesting an access token from a digital wallet of the device.

10. The system of claim 8, wherein the federated learning engine is further configured to detect an anomalous device within the network based on behavior of the anomalous device.

11. The system of claim 6, wherein the identifier includes a cryptographic hash of an identifier of the device and an attribute of the device.

12. The system of claim 6, wherein the different device is further configured to admit the device to the network by transmitting an access token and a new identifier to the device.

13. The system of claim 12, wherein the authenticator and the different device are further configured to re-authenticate the device, via the CMFA, based on the access token or the new identifier.

14. A method for authenticating a device within a network of devices, the method comprising:
- enabling the device to operate on the network subject to a network policy, wherein the network policy disables the device from performing at least one operation within the network before verifying an identity of the device via an identifier having a cryptographic certificate;
- first verifying an identity of the device within the network based on an identifier of the device and using a distributed ledger;
- second verifying the identity of the device based on authentication by a federated learning engine implemented on other devices within the network and in communication with the device using the distributed ledger, wherein the federated learning engine is configured to perform the second verifying of the identity of the device in response to an attempted policy-violative behavior of the device within the network, based on a continuous multi-factor authentication (CMFA) and an activity history of the device within the network; and
- enabling the device to perform the operation in response to the first verifying and the second verifying.

15. The method of claim 14, further comprising:
- determining whether the identifier has corresponding activity in the distributed ledger;
- requesting the cryptographic certificate within the distributed ledger, in response to the identifier not having corresponding activity in the distributed ledger; and
- admitting the device to the network by verifying at least one of the cryptographic certificate or the identifier.

16. The method of claim 15, wherein the second verifying includes requesting the cryptographic certificate by requesting an access token from a digital wallet of the device.

17. The method of claim 14, further comprising admitting the device to the network by transmitting an access token and a new identifier to the device.

18. The method of claim 17, further comprising detecting, via the federated learning engine, an anomalous device within the network based on a behavior of the anomalous device.

* * * * *